United States Patent [19]

Ozawa

[11] Patent Number: 5,003,425
[45] Date of Patent: Mar. 26, 1991

[54] TAPE CASSETTE HAVING TAPE CONTACTING SLACK REGULATING PORTIONS

[75] Inventor: Kazuo Ozawa, Miyagi, Japan

[73] Assignee: Sony Corporation, Tokyo, Japan

[21] Appl. No.: 541,468

[22] Filed: Jun. 25, 1990

Related U.S. Application Data

[63] Continuation of Ser. No. 270,219, Nov. 14, 1988, abandoned.

[30] Foreign Application Priority Data

Nov. 20, 1987 [JP] Japan .................... 62-294783

[51] Int. Cl.⁵ .............................. G11B 23/02
[52] U.S. Cl. ................................. 360/132; 242/199
[58] Field of Search ............... 360/132; 242/197–199

[56] References Cited

U.S. PATENT DOCUMENTS

| | | | |
|---|---|---|---|
| 3,888,429 | 6/1975 | Mack | 242/55.19 A |
| 4,386,746 | 6/1983 | Okamura et al. | 242/199 |
| 4,546,936 | 10/1985 | Okamura et al. | 242/198 |
| 4,754,357 | 6/1988 | Nelson | 360/132 |

FOREIGN PATENT DOCUMENTS

| | | |
|---|---|---|
| 0190908 | 8/1986 | European Pat. Off. . |
| 2033503 | 1/1971 | Fed. Rep. of Germany . |
| 8516472 | 8/1985 | Fed. Rep. of Germany . |
| 3511227 | 10/1985 | Fed. Rep. of Germany . |
| 61-118167 | 7/1986 | Japan . |
| 63-22687 | 2/1988 | Japan . |
| 2176170 | 12/1986 | United Kingdom . |

*Primary Examiner*—A. J. Heinz
*Attorney, Agent, or Firm*—Hill, Van Santen, Steadman & Simpson

[57] ABSTRACT

An improved tape cassette having slack-regulating walls positioned adjacent the tape run and configured to provide small-area tape contacting portions of various forms.

8 Claims, 4 Drawing Sheets

TAPE CASSETTE HAVING TAPE CONTACTING SLACK REGULATING PORTIONS

This is a continuation of application Ser. No. 07/270,219, filed Nov. 14, 1988 now abandoned.

This invention relates to tape cassettes such as those suitable for use for video tape, audio tape, and the like.

DESCRIPTION OF THE PRIOR ART

In the prior art tape cassettes for video tape as shown in FIG. 4 have been used. Referring to FIG. 4, there is generally shown a tape cassette 1. This tape cassette 1 has an upper half 1a and a lower half 1b joined together and a supply reel and a take-up reel (not shown) are incorporated therewithin. Such a structure is shown in U.S. Pat. Nos. 4,386,746 AND 4,546,936, for example.

In addition a magnetic tape 10 loaded between both the reels within the tape cassette 1 is exposed to the outside between a tape guide 3 disposed at one end of the front side of this tape cassette 1 where a tape outlet 2 is provided, and a tape guide 5 at the other end of the front side where a tape inlet 4 is provided. The front side of the tape cassette 1 is covered by a front lid (not shown) during storage, and uncovered to expose the magnetic tape 10 only when the tape cassette is loaded in a video tape recorder.

Moreover, tape slack regulating walls 6 and 7 are provided on the front side of the tape cassette 1 at two positions close to the back side of the exposed magnetic tape 10. These tape slack regulating walls 6 and 7 each provide a flat surface parallel to the magnetic tape 10 and which are spaced by slight gap from the tape.

When this tape cassette 1 is loaded in the video tape recorder in order that the magnetic tape 10 can be recorded or reproduced, the magnetic tape 10 partially exposed to the front side is pulled out and wrapped around a rotating drum so that signals are recorded on or reproduced from the tape by magnetic heads provided on the rotating head drum. In order to fast forward and rewind the magnetic tape 10, the magnetic tape 10 pulled out for recording or reproduction is pulled back to extend straight between the tape outlet 2 and the tape inlet 4 and the take=up reel or supply reel is rotated at high speed. At this time, the tape slack regulating walls 6 and 7 close to the back side of the exposed, straight portion of the magnetic tape 10 act to prevent the magnetic tape 10 from slacking.

During the time that the magnetic tape 10 is fast forwarded or rewound, however, the tension in the magnetic tape often varies greatly, to an extent that the magnetic tape 10 comes in contact with the tape slack regulating walls 6 and 7. When the tape contacted with the walls during the time that the tension was changed, the reel often stopped rotating to interrupt the fast forwarding (rewinding) operation. Particularly when the magnetic tape 10 has a certain coating on its back side, or is a so-called "back-coating" type, the friction coefficient at the time of the contact with the tape slack regulating walls 6 and 7 is so high that the tape easily sticks to the regulating walls 6 and 7 and therefore the possibility that the fast forwarding (rewinding) operation will be interrupted is high.

In order to prevent the above problem, the whole tape slack regulating wall is sloped so that its contact area with the magnetic tape is reduced as proposed in Japanese Utility Model Laid-Open Gazette No. 118167.1986. With this structure, however, the magnetic tape is not satisfactorily prevented from coming in contact with the tape slack regulating walls and thereby stopping the rotation of the reels.

SUMMARY OF THE INVENTION

This invention, in view of such points, is to provide a tape cassette capable of allowing the tape to be stably fast forwarded and rewound and thus preventing the reels from being interrupted in their rotation.

According to the present invention, there is provided a tape cassette 1 which, as, for example, shown in FIG. 1, has tape slack regulating walls 8, 9 provided close to the exposed portion of the tape.

The tape slack regulating walls 8, 9 are curved, concavely, along the tape travel direction and stair portions 8a, 9a parallel to the tape travel direction may be provided on the curved tape-slack regulating walls 8, 9. In operation the tape bridges the area between the stair portions 8a, 9a.

According to the tape cassette of this invention, since the stair portions 8a,9a are provided on the tape slack regulating walls 8,9, an air film is formed between the tape and the walls during tape travel, making it difficult for the tape to stick to the tape slack regulating walls 8,9. Even if it should contact therewith, the curved tape slack regulating walls 8,9 exert almost no adverse influence on the tape travel because of the very small contact area, and thus the tape can be kept stable in its travel upon fast forwarding or rewinding.

DETAILED DESCRIPTION

Figure 2:
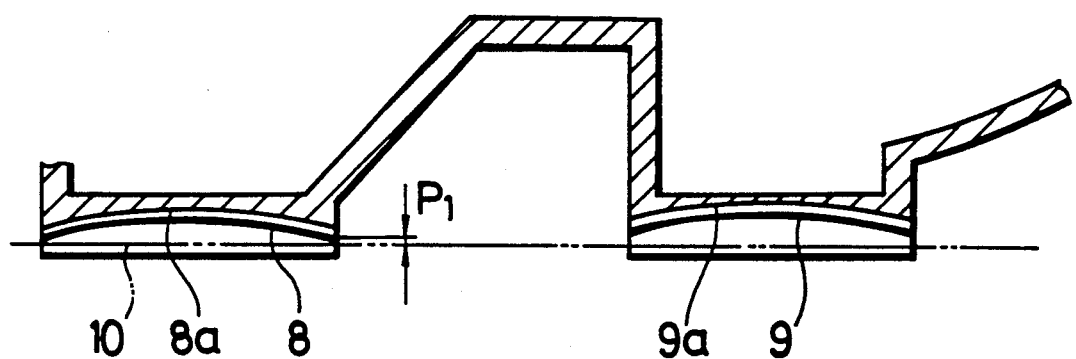
FIG. 2 is a cross-sectional diagram taken along line II—II in FIG. 1.
Figure 3:
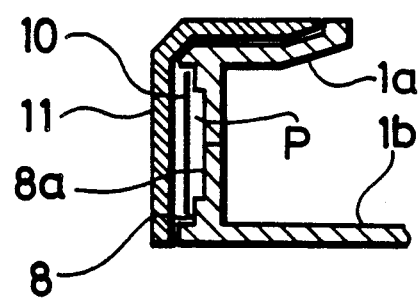
FIG. 3 is a cross-sectional diagram taken along a line III—III in FIG. 1.
Figure 1:
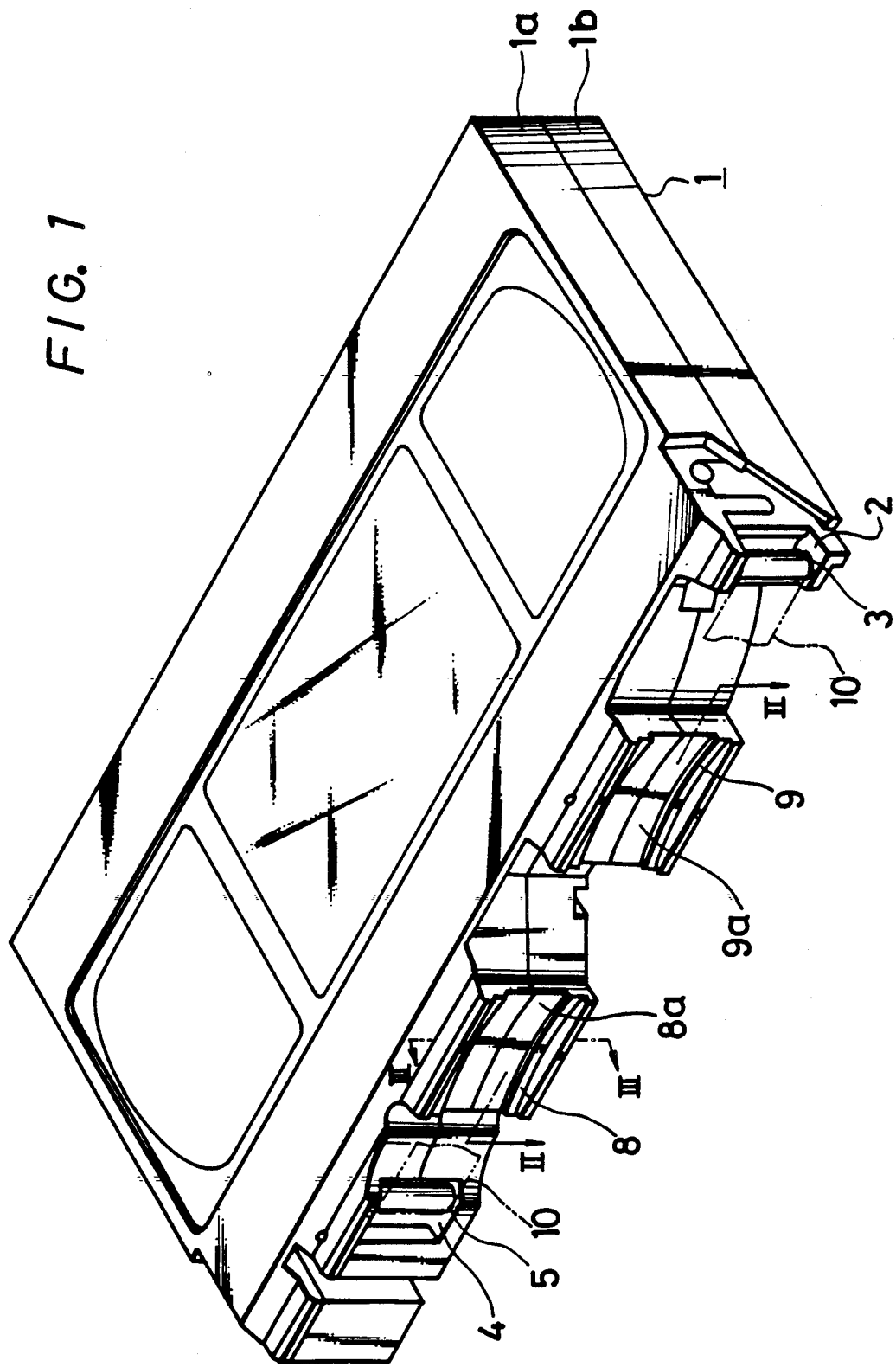
FIG. 1 is a perspective view of one embodiment of a tape cassette of this invention.

A first embodiment of a tape cassette of this invention will be described with reference to FIGS. 1 to 3. In FIGS. 1 to 3, like elements corresponding to those in FIG. 4 are identified by the same reference numerals and will not be described in detail.

Figure 4:
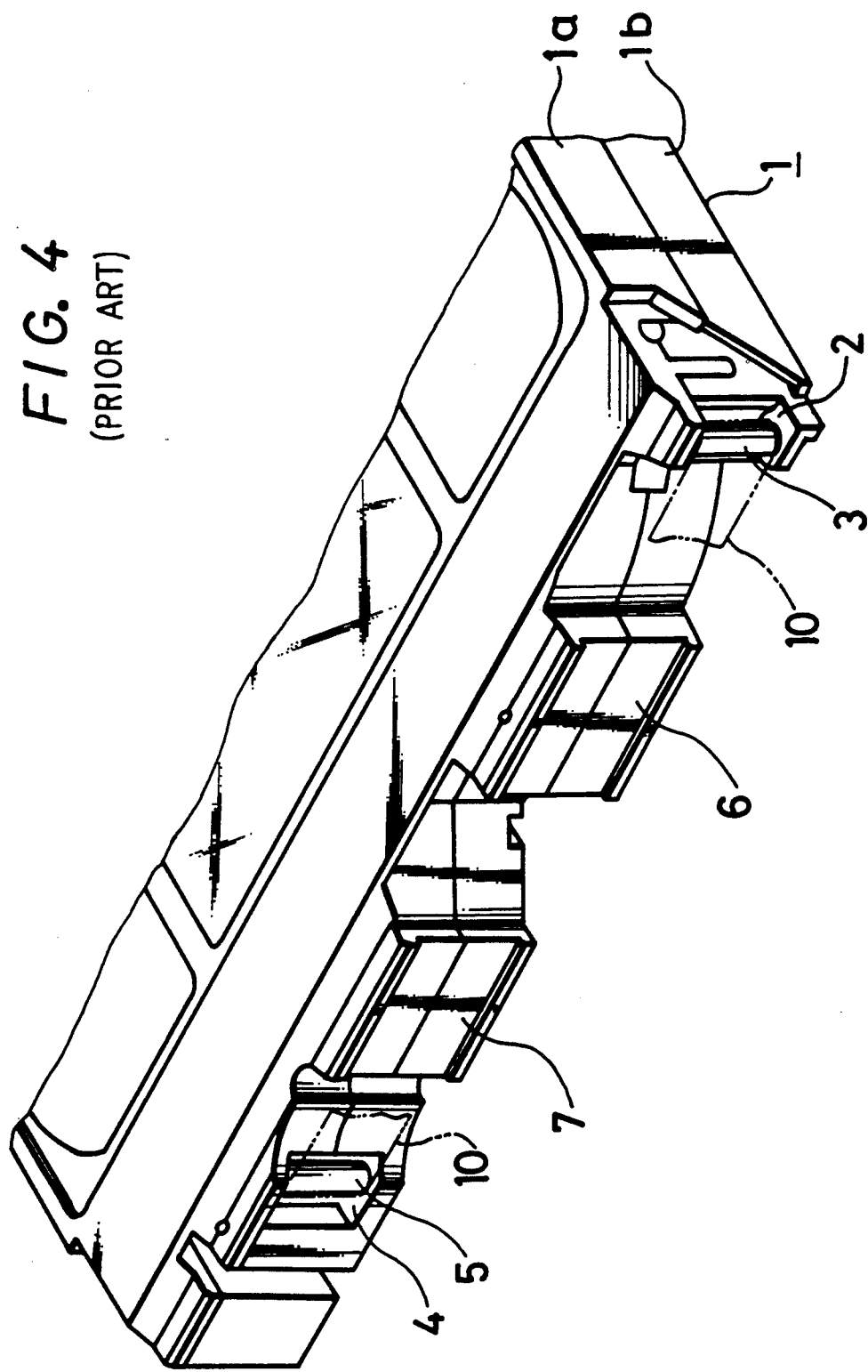
FIG. 4 is a perspective view of a main part of one example of the conventional prior art tape cassette.

This embodiment of a tape cassette is a video tape cassette that can be loaded in the same type of conventional video tape recorder as that shown in FIG. 4. As shown in FIG. 1, tape slack regulating walls 8 and 9 are provided on the tape-exposed portion between the tape guides 3 and 5 that are disposed on the front side of the tape cassette 1. These tape slack regulating walls 8 and 9 are close to the back side of the magnetic tape 10 and curved in a concave manner along the direction of travel of the magnetic tape 10. In other words, the tape slack regulating walls 8 and 9, as shown in FIGS. 1 and 2, are curved so that the gap, P1 between the back side of the magnetic tape 10 and the walls is the narrowest at the ends close to the tape outlet 2 and the tape inlet 4 and becomes gradually larger as one goes to their centers.

These curved tape slack regulating walls 8 and 9, as shown in FIGS. 1 and 3, have stair portions 8a, 9a parallel to the direction of travel of the magnetic tape 10 provided toward the center relative to the widthwise direction of the magnetic tape 10. The gap betwen the stair portion 8a, 9a and the back side of the magnetic tape 10 is larger than that between any other cassette portion and the back side of the tape. In FIG. 3, 11 represents the front lid, omitted in FIG. 1.

The other portions of this tape cassette 1 are constructed in the same way as that shown in FIG. 3.

This tape cassette 1 constructed as described above has the feature that since the tape slack regulating walls 8, 9 have their stair portions 8a,9a provided, defined, uninterrupted air film is formed between the stair portions 8a, 9a and the magnetic tape 10 when the magnetic tape 10 is traveling, and acts to prevent the magnetic tape 10 from coming in contact with the tape slack regulating walls 8,9 thus making it difficult for the magnetic tape 10 to make substantial contact with the tape slack regulating wall 8,9. In addition, because the tape slack regulating wall 8,9 is curved, the magnetic tape 10 will not stick to the regulating walls 8,9 because of the very small contact area even if the magnetic tape 10 should have some contact with the tape slack regulating wall 8,9. Thus, even when the tape tension varies during the time that the magnetic tape 10 is forwarded or rewound at high speed the magnetic tape 10 is scarcely in contact with the tape slack regulating wall 8,9. Because of the small contact area the reels will not be stopped or interrupted in their rotation.

This invention is not limited to the above embodiment but can of course take other various constructions without departing from the principle of the invention.

Figure 5:
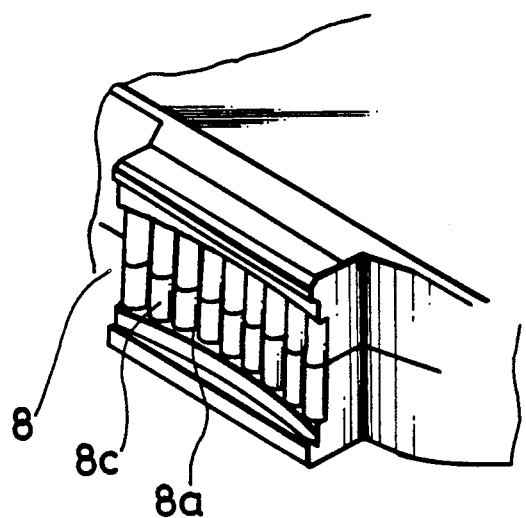
FIG. 5 is an isometric view of a second embodiment.
Figure 6:
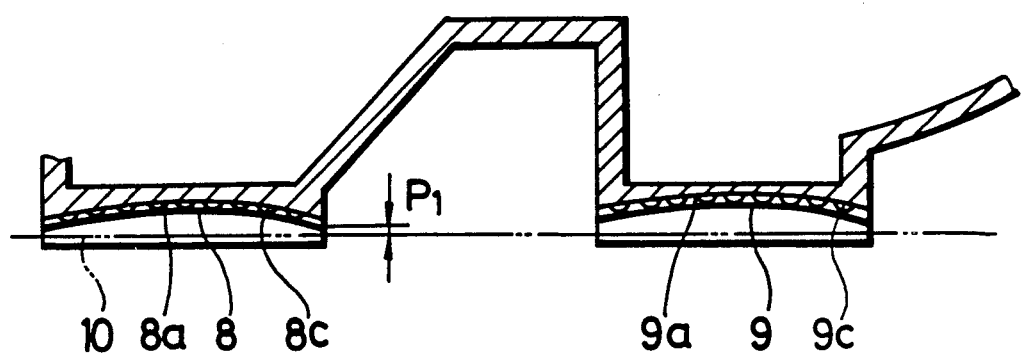
FIG. 6 is a cross-sectional plan view, like FIG. 2 showing the embodiment of FIG. 5.

A second embodiment of the invention is shown in FIGS. 5 and 6. There the concave portion 8,9 is provided with rounded, transverse, projections 8c. The surface 8c closest to the tape is preferably practically the same distance as the tape surfaces 8,9 but it may be moved slightly further away if desired. This structure also provides an effective air curtain support for the tape without providing substantial contact between the tape and the cassette during tape run.

According to the tape cassette of this invention, the magnetic tape is prevented from substantial contact with the tape slack regulating walls and even if some slight contact is made therewith, the magnetic tape is kept stable in its travel because of the small contact area so that the reels are not interrupted in their rotation upon fast forwarding or rewinding.

I claim as my invention:

1. A tape cassette formed by walls for containing reels therein, said cassette having an opening permitting the passage therethrough of a tape and one of said walls having a cutout permitting pulling out said tape from said cassette and having tape slack regulating portions for the exposed tape being provided at both sides of said cutout, the improvement comprising each of said slack regulating portions extending generally longitudinally of said tape travel direction and having longitudinally spaced ends for contacting the tape, and each of said portions having a single continuous concave curved surface extending between the spaced ends at the center of each of said portions and providing only small areas of contact at both spaced ends of each of said portions with the tape during a tape run.

2. A tape cassette formed by walls for containing reels therein, said cassette having an opening permitting the passage therethrough of a tape and one of said walls having a cutout permitting pulling out said tape from said cassette and having tape slack regulating portions for the exposed tape being provided at both sides of said cutout, the improvement comprising said slack regulating portions extending generally longitudinally of said tape, each of said portions having spaced ends and being curved in a concave manner at the center of each of said portions in the tape travel direction, each of said portions being stepped to provide a recess extending away from the tape and also extending longitudinally of the tape travel direction between said ends to limit the tape contact with each curved portion to two spaced points at each end of each portion during a tape run.

3. The cassette of claim 2 wherein a plurality of transverse projections are provided on said recess.

4. The cassette of claim 2 wherein longitudinally spaced projections extend from the recess toward the tape to provide a plurality of small, spaced tape contact areas.

5. A tape cassette formed by walls for containing reels therein, said cassette having two spaced openings for permitting the passage therethrough of a tape and one of said walls having a cutout permitting pulling out of said tape from said cassette and having tape slack-regulating portions for the exposed tape being provided at both sides of the cutout, the improvements comprising each of said tape slack-regulating portions extending between spaced ends generally along a travel direction of said tape and having means for creating an air curtain between a surface of the portion and the tape, said means including a central recess forming a pair of side surfaces for supporting edges of the tape, said side surfaces being concavely curved in said tape direction to limit contact with said tape to ends of the side surfaces.

6. A cassette according to claim 5, wherein longitudinally spaced projections extend from the recess toward the tape to provide a plurality of small, spaced tape contact areas.

7. A tape cassette according to claim 5, wherein said recess is concavely curved in said tape direction.

8. A cassette according to claim 5, wherein a plurality of transverse projections are provided in said central recess.

* * * * *